United States Patent [19]

Gilmour

[11] 4,413,332
[45] Nov. 1, 1983

[54] SCANNING BEAMFORMER FOR A VERY HIGH RESOLUTION CIRCULAR ARC SONAR

[75] Inventor: George A. Gilmour, Severna Park, Md.

[73] Assignee: The United States of America as represented by the Secretary of the Navy, Washington, D.C.

[21] Appl. No.: 277,357

[22] Filed: Jun. 24, 1981

[51] Int. Cl.³ .................................................. G01S 3/82
[52] U.S. Cl. .................................... 367/123; 367/122
[58] Field of Search ............................... 367/123, 122

[56] References Cited

U.S. PATENT DOCUMENTS

| | | | |
|---|---|---|---|
| 3,370,267 | 2/1968 | Barry | 367/123 |
| 4,152,678 | 5/1979 | Shott et al. | 367/123 |
| 4,233,678 | 11/1980 | Brady | 367/123 |

OTHER PUBLICATIONS

White et al., Sonar Signal Processing With CCD's, U.S. Dept. of Commerce, National Tech. Information Services, May 1974, pp. 7-1 through 7-19.
Grace et al., Acous. Soc. of Amer., vol. 24, No. 5 1968, pp. 1453-1454.
Grace et al., Acous. Soc. of Amer., vol. 48, No. 6 Part 1, 1969, pp. 1311-1318.

Primary Examiner—Richard A. Farley
Attorney, Agent, or Firm—Robert F. Beers; Arthur A. McGill; Prithvi C. Lall

[57] ABSTRACT

A high resolution scanning beamformer for a soundhead having a circular or a cylindrical array of hydrophones uses charge coupled devices as transversal filters in a plurality of first stage quadrature sampled phase shift steered beamforming modules. In a second stage, serial-in/serial-out charge coupled devices are used to correct for fill time. The sonar focuses at all nearfield ranges of interest by controllably varying a clocking rate.

22 Claims, 6 Drawing Figures

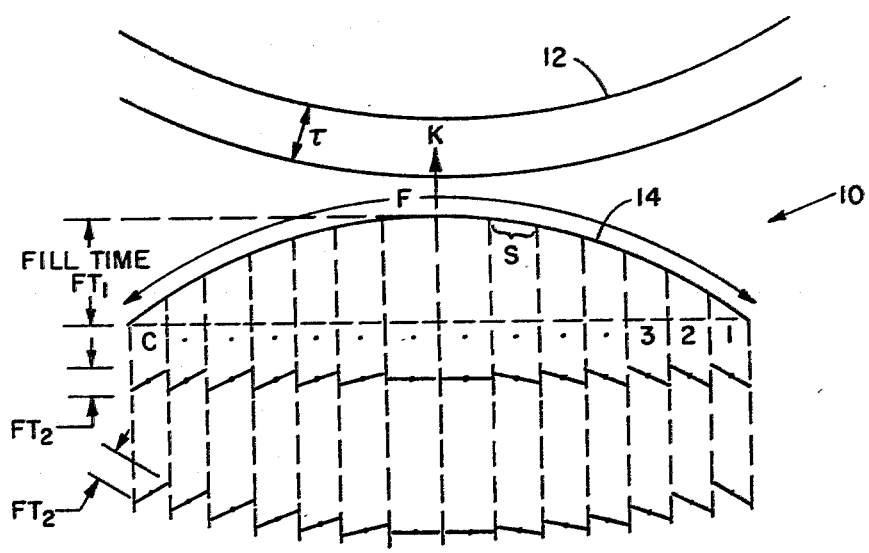
Fig. 1A
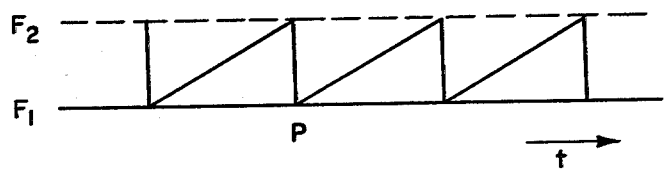
Fig. 1B
Fig. 1

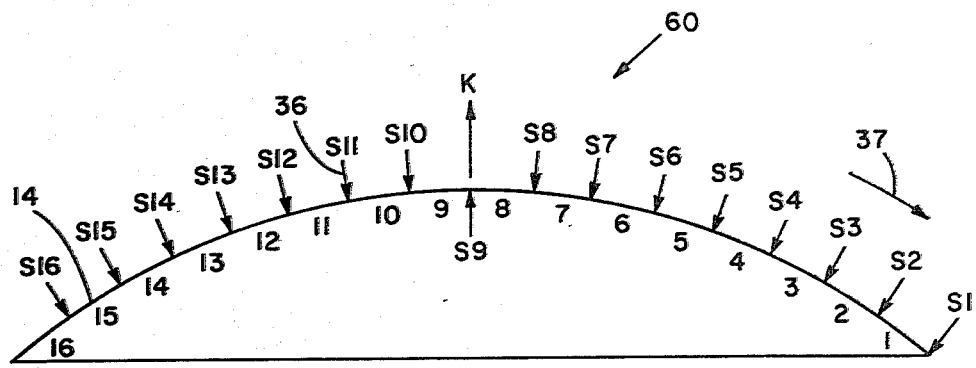
Fig. 4A
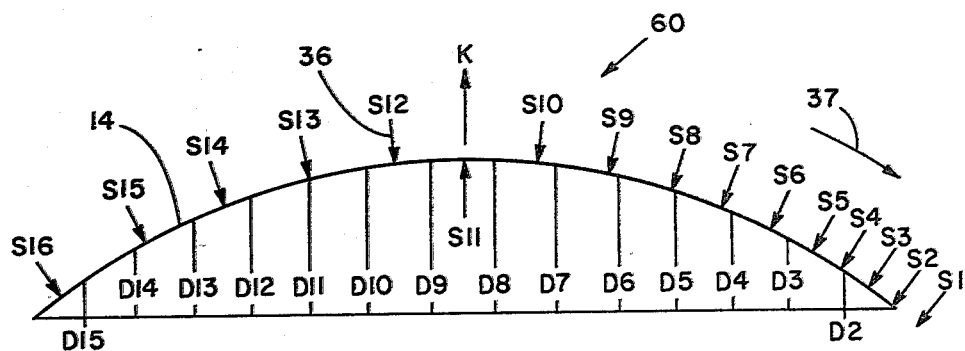
Fig. 4B
Fig. 4

SCANNING BEAMFORMER FOR A VERY HIGH RESOLUTION CIRCULAR ARC SONAR

BACKGROUND OF THE INVENTION

This invention is drawn to the field of underwater acoustics, and more particularly, to a very high resolution scanning within-pulse quadrature sampled phase shift beamformer for a circular or cyclindrical soundhead, and still more particularly, to such a beamformer that corrects for fill time and focuses at all nearfield ranges of interest.

U.S. Pat. No. 4,233,678, issued Nov. 11, 1980 to Brady, incorporated herein by reference, provides a within-pulse quadrature sampled scanning phase shift beamformer for beamforming a soundhead having a circular or cylindrical array of hydrophone elements. Under control of a clocking signal of constant frequency, an analog multiplexer scans the array and sequentially shifts inphase ($I_i$) and quadrature phase ($Q_i$) samples from successive hydrophones of the soundhead into a serial-in/parallel-out charge transfer device operated as a transversal filter. The parallel outputs are resistively phase shifted and combined on a pair of differential buses for forming the Inphase (I) and Quadrature phase (Q) beam component signals corresponding to a particular azimuthal beam direction (k) as represented by the equations:

$$I_k = \sum_{i=1}^{n} W_i I_i \cos\theta_i + W_i Q_i \sin\theta_i, \text{ and} \quad (1)$$

$$Q_k = \sum_{i=1}^{n} W_i Q_i \cos\theta_i - W_i I_i \sin\theta_i, \text{ where} \quad (2)$$

n is the number of azimuthally ordered hydrophones used to form beam k, $W_i$ represents the shading factor used for side lobe suppression, and $\cos\theta_i$ and $\sin\theta_i$ represent the phase shift operator used for steering the array. The magnitude of the beam for a particular azimuthal beam direction (k) is calculated by an approximation to the square root of $I_k^2 + Q_k^2$. The output of Brady is thus a sequence of consecutive azimuth-ordered beams which occur at the rate at which the quadrature sampled outputs of the hydrophones are sequentially supplied to the charge transfer device from the analog multiplexer, which rate is selected to ensure that all beams are formed within a ping length.

Such a quadrature sampled phase shift beamformer, however, is performance limited because the degree of resolution that can be obtained is restricted by an effect called the array fill time. Since the phase shift operator modifies the relative phases of the quadrature sampled outputs in a manner where coherent combination is accomplished without regard to the signal time of arrival, the soundhead is not full whenever the leading edge of the actual signal is entering the array or the trailing edge is clearing the array, leading to such effects as lower sensitivity, wider beamwidth and pulse stretching.

Another factor that materially impacts the degree of the resolution obtainable is the capability of the beamformer to focus, that is, to accommodate the spherical wavefront arising from within the nearfield of the soundhead rather than approximating it as a plane wave. The plane wave approximation is accurate for signals arising from within the farfield of the soundhead. The nearfield/farfield transition region is commonly assumed to be located about $d^2/\lambda$ away from the soundhead, where d is the characteristic dimension of the beamforming aperture and $\lambda$ is the sonar wavelength. From the beamformer standpoint, however, it is clear that the nearfield/farfield boundary (R') decreases in range as resolution improves. Therefore, the performance of very high resolution systems which are sure to operate with targets in the very nearfield is resolution limited by the capability of the beamformer to focus.

SUMMARY OF THE INVENTION

Generally, the present invention provides a within-pulse quadrature sampled phase shift beamformer for beamforming a soundhead having a circular or cylindrical array of hydrophones the performance of which is not resolution limited either by a failure of the beamformer to focus at all nearfield ranges of interest or by a failure to account for the fill time.

The novel very high resolution within-pulse quadrature sampled scanning phase shift beamformer of the present invention which sequentially forms a beam from adjacent preselected fractions F of T hydrophone elements arranged on an arc of a soundhead comprises a clock for providing a clocking signal; a plurality of first stage modules responsive to the clocking signal for concurrently sampling in quadrature C groups of S hydrophone elements, where $C \times S = F$, and for concurrently processing each of the C sampled groups to form C first stage I and Q beam component signals; second stage means responsive to the clocking signal and to the first stage I and Q beam component signals for applying predetermined time delays to preselected ones of the I and the Q beam component signals in order to correct for the fill time; and means responsive to the selectively delayed I and Q beam component signals and to the clocking signal for combining the selectively delayed I and Q beam component signals to form an I and a Q beam for a particular azimuthal direction. The beam pattern for a particular azimuthal direction is computed by conventional means as an approximation to the square root of the sum of the squares of the I and Q beams. After scanning the beam pattern through a preselected azimuth, the first stage modules retrace and the operation is repeated.

According to one feature of the preferred embodiment, synchronization of the concurrently run first stage module processing is accomplished through the use of predetermined offsets of the first stage samplers relative to each other as they scan the soundhead. The offsets are selected such that for a given scan rate each of the C samplers samples the S elements used in the formation of a first stage module beam at a time that corresponds to the fill time for the particular group of S elements.

According to another feature of the preferred embodiment, focusing the beamformer at all nearfield ranges of interest is accomplished through the use of a clocking signal that ramps from a first preselected frequency to a second preselected frequency during a pulse period. In this manner, the novel beamformer of the present invention electronically controls the geometry of the soundhead to correspond to the curvature of incident spherical waves of acoustic energy arising from within the nearfield.

Accordingly, it is a general object of the present invention to provide a very high resolution within-pulse scanning beamformer for a circular or cyclindrical array that displays a preselected azimuth.

It is another object of the present invention to provide such a beamformer that provides for the time it takes to fill the array.

It is another object of the present invention to provide such a beamformer that focuses at all nearfield ranges of interest.

Yet another object of the present invention is to provide such a beamformer that is essentially analog in nature.

These and other objects, advantages and novel features of the present invention will become apparent from the appended claims and the following detailed description and the drawings, wherein like parts are similarly designated throughout, and wherein:

DESCRIPTION OF THE DRAWINGS

FIGS. 1A and 1B, which are also legended as FIG. 1, are diagrams useful for illustrating the principles of operation of the novel beamformer according to the present invention;

DETAILED DESCRIPTION OF THE PREFERRED EMBODIMENT

Referring now to FIG. 1A, generally designated at 10 is a diagram illustrating the principle of operation of the novel beamformer according to the present invention. A longitudinally propagating spherical compressional wave of acoustic energy 12 having a ping length $\tau$ is shown impinging upon an arcuate soundhead 14, where F hydrophones are used in the formation of any given azimuthal center beam K. The uncorrected soundhead 14 has a maximum fill time depicted as $FT_1$, which, as discussed in the background of the invention, is the time it takes for the wave of acoustic energy 12 to "fill" the F elements used in the formation of the given azimuthal beam. Reference in this connection may be had to U.S. Pat. No. 3,370,267, issued Feb. 20, 1966 to Barry, incorporated herein by reference.

According to the present invention, the fill time is substantially reduced by concurrently processing the F elements used in the formation of a given azimuthal center beam (K) in C groups of S elements each, where $C \times S$ is equal to F, as illustrated by the dashed verticle lines. As will appear more fully below, a plurality of first stage beamforming modules is provided for forming I and Q first stage beam component signals for each of the C groups of S elements. The I and Q beam component signals from each of the first stage modules are then selectively delayed in a second stage module according to the position of the particular group of S elements relative to the given center beam being formed in order to correct for the fill time. The module implementation of the present invention corrects for the time it takes to fill adjacent groups of S elements reducing the fill time from the length designated $FT_1$ to a maximum length designated $FT_2$. As shown by the variable slope of the diagonal lines, the fill time is at a maximum for the outer modules used to form beam K and is comparatively less for those modules that are closer to the beam center position (K).

Both the first and second stage module processes are under control of a clocking signal. Referring now to FIGS. 1A and 1B, the novel beamformer according to the present invention focuses by ramping the clocking signal from a first frequency F1 to a second frequency F2 in a time that corresponds to the pulse period (P), which period equals two (2) times the maximum design range of the sonar divided by the nominal speed of sound in water. In this manner, the beamformer of the present invention electronically processes the module signals to match the curvature of the acoustic signal 12 arising from within the nearfield of the soundhead 14, as discussed in the background of the invention. It is to be noted that the curvature in FIG. 1A has been exaggerated to better illustrate focusing and that the clock frequency as a function of time of FIG. 1B has been shown for simplicity of exposition to be sawtooth shaped, although it has a non-linear shape as will appear more fully below.

Figure 2:
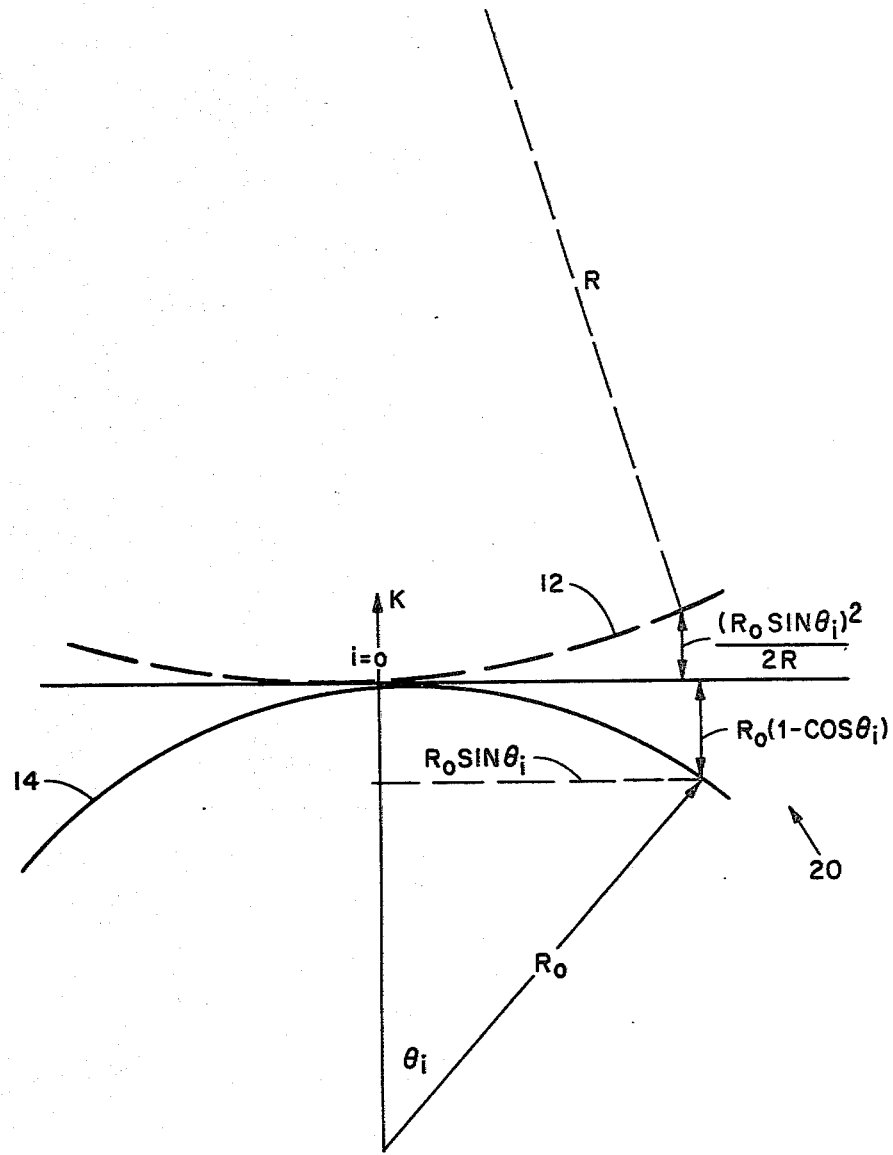
FIG. 2 is a diagram showing the geometry of a circular arc soundhead according to present invention.

Beamforming a circular or cylindrical arc can be thought of in terms of sampling at the proper time on the incoming wavefront. All samples must be taken at the proper phase or else a phase shift must be implemented to compensate for the error. Referring now to FIG. 2, which shows generally at 20 a diagram that depicts the geometry of the beamformer of the present invention, the time for the ith sample can be found from:

$$ft_i - R_o(1 - \cos \theta_i) - [(R_o \sin \theta_i)^2/2R] = \text{constant}; \quad (3)$$

where f is the sonar frequency, $t_i$ is the time the ith sample is taken, $R_o$ is the radius of the soundhead 14 in wavelengths and R is the range in wavelengths. The second term, $R_o(1 - \cos \theta_i)$, represents the fill time and the third term, $(R_o \sin \theta_i)^2/2R$, represents a parabolic approximation to the focus term.

If the center element for a given azimuthal center beam (K) is sampled at $t_o = 0$, then we can evaluate the constant in equation (3) and relate all other sampling times to this reference. This selection makes the constant equal to zero. Therefore, the time for the ith sample is:

$$t_i = (R_o/f)(1 - \cos \theta_i) + (R_o \sin \theta_i)^2/(2Rf) \quad (4)$$

The last sample used to form beam K is taken at a time:

$$t_{imax} = (R_o/f)(1 - \cos \theta_{imax}) + (R \sin \theta_{imax})^2/(2Rf). \quad (5)$$

The sample of the center element for the $K^{th}$ center beam must be stored this amount of time to wait for all the samples to come in. Any other sample must be stored for a time:

$$\tau_i = t_{imax} - t_i \quad (6)$$

Very high resolution sonar beamforming can be accomplished if the samples are taken at the times indicated in equation (4) and stored for the times indicated in equation (6).

As discussed more fully below, the first term on the right hand side of equation 4 (the fill time term) is implemented according to the present invention by an offset in the ith sampler position relative to the center element sampler. If the sampling is controlled with a clock of frequency $f_c$ (period $T_c = 1/f_c$), then the ith element should be sampled $N_i$ samples after the $O^{th}$ element:

$$t_i = N_i T_c = (R_o/f)(1 - \cos\theta_i) + (R_o \sin\theta_i)^2/(2Rf). \quad (7)$$

If the clock period for infinite range is $T_{c\infty}$, then:

$$N_i = R_o/(fT_{c\infty})(1 - \cos\theta_i). \quad (8)$$

This establishes the offset sample positions for all elements.

The second term on the right hand side of equation (4) (the focus term) is implemented according to the present invention by slowing down the sampling rate ($f_c = 1/T_c$), i.e., increasing the period from $T_{c\infty}$ to $T_c$. The correction is made perfect for the center of the array (i=0). The number of delay elements ($D_i$) required to implement $\tau_i$ follows from equation (6) and is:

$$D_i = N_{imax} - N_i. \quad (9)$$

Since the reference is i=0, $N_o = 0$ and $D_o = N_{imax}$. The period for focusing the center element for range R can be related to the period for $R = \infty$ by dividing equation (7) by equation (8). This reduces to:

$$T_c = T_{c\infty}[1 + (R_o/2R)(1 + \cos\theta_{max})]. \quad (10)$$

Focusing is accomplished according to the present invention by ramping the clock rate during the pulse period (P) from about 95% $f_{c\infty}$ at minimum range to about 99.5% $f_{c\infty}$ at maximum range obeying the relationship of equation (10).

Figure 3:
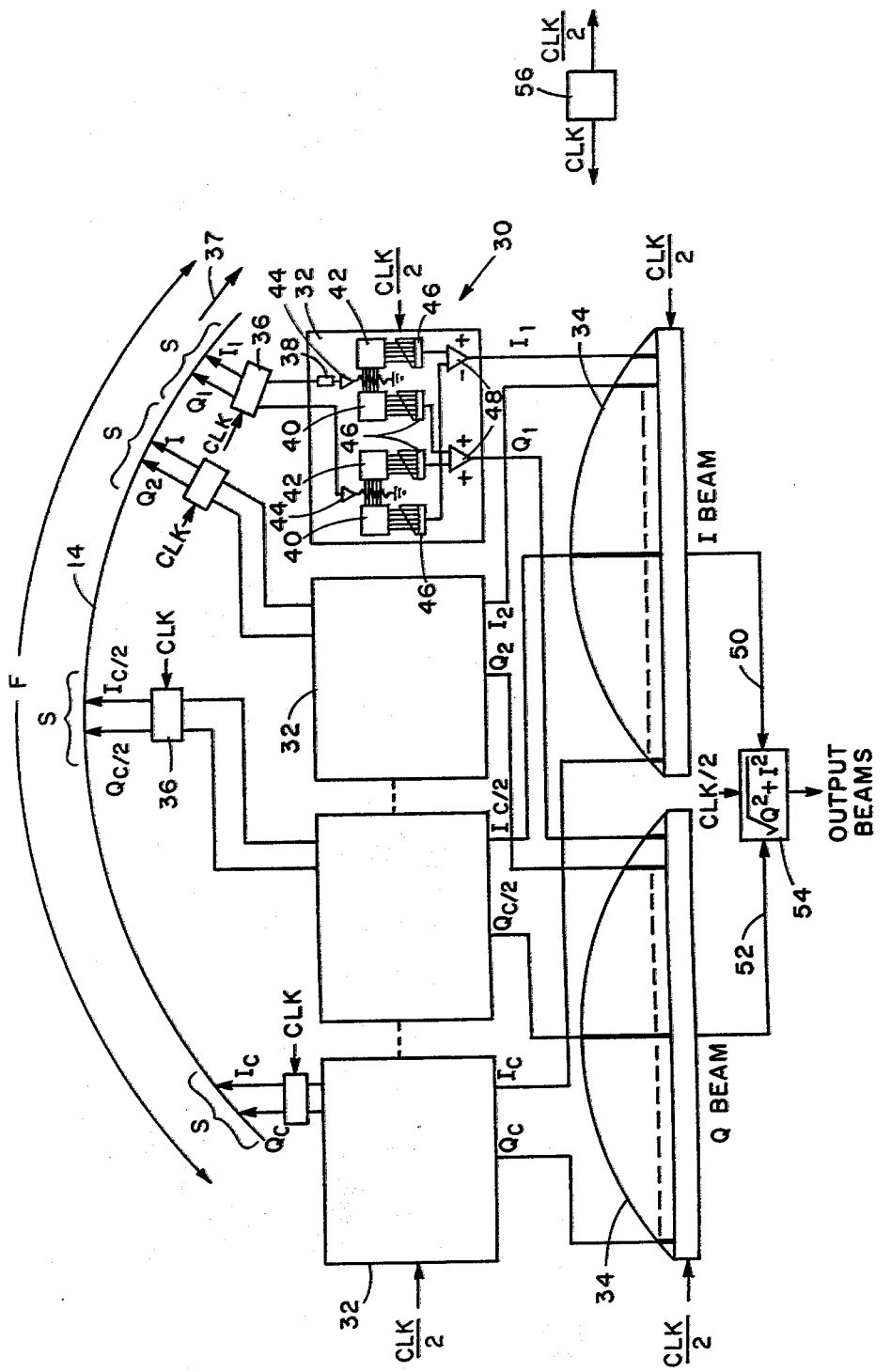
FIG. 3 is a simplified block diagram of the novel beamformer according to the present invention, and FIGS. 4A and 4B, which are also legended as FIG. 4, are schematics useful in explaining the synchronization of the concurrently run first stage modules according to the present invention.

Referring now to FIG. 3, generally designated at 30 is a simplified block diagram of the novel beamformer according to the present invention. The beamformer 30 comprises C first stage quadrature sampled phase shift beamforming modules 32 and second stage time delay modules 34.

Each of the quadrature sampled phase shift first stage beamforming modules 32 includes an analog multiplexer 36 for sequentially providing inphase (I) and quadrature phase (Q) samples of S transducer elements. Each of the multiplexers 36 scan the array 14 in a clockwise direction as indicated by the arrow 37. Reference in this connection may be had to the articles entitled: "Quadrature Sampling of High-Frequency Waveforms" and "Sampling and Interpolation of Bandlimited Signals by Quadrature Methods", by O. D. Grace and S. P. Pitt, appearing at Volume 24, No. 5, at pages 1453-1454 and at Volume 48, No. 6, (Part I) at pages 1311-1318, respectively, of the Journal of the Acoustical Society of America, which are incorporated herein by reference.

A delay element 38 is connected in the I sampler to delay the I samples from each hydrophone element by T/4, where T is the sonar period, to synchronize the I and Q samples. The synchronized I and Q samples are respectively applied to a sine resistor dividing network 40 and a cosine resistor dividing network 42 to phase shift steer the quadrature sampled S elements. Amplifiers 44 provide amplitude shading to the sine/cosine resistor dividers 40, 42 for side-lobe supression according to the well known Dolph-Chebyshev (Tschebyscheff) method, which, for a specified beamwidth, gives the lowest possible side lobe levels, and for a specified set of side lobes relative to the main beam, gives the narrowest possible beamwidth.

The outputs of these networks are then entered into summing parallel-in/serial-out charge coupled devices 46 of conventional design. Each of the CCD's 46 has S parallel delay channels. The serial-output from each of the CCD's 46 is combined in summing amplifiers 48 to provide an I and a Q first stage beam component signal as represented by the following equations:

$$I_K = \sum_{i=1}^{S} W_i I_i \cos\theta_i - W_i Q_i \sin\theta_i, \text{ and} \quad (11)$$

$$Q_K = \sum_{i=1}^{S} W_i I_i \sin\theta_i + W_i Q_i \cos\theta_i, \text{ where} \quad (12)$$

$I_K$ and $Q_K$ are the Inphase and Quadrature phase first stage beam components, $W_i$ represents the shading factor used for side lobe suppression, $I_i$ and $Q_i$ represent the Inphase and Quadrature phase sampled hydrophone signals and $\sin\theta_i$ and $\cos\theta_i$ represent the phase shift operators used for steering the array. The steering function accomplished by each of the modules 32 is essentially the same as the steering function performed by the Brady reference discussed in the background of this invention, which, it will be appreciated, uses the charge coupled devices and associated resistor networks as transversal filters.

The second stage module 34 comprises a pair of conventional summing serial-in/serial-out charged coupled devices (CCD's) having C parallel delay channels shown in heavy lines. One serial-in/serial-out CCD is provided for the I beam component signals and the other CCD is provided for the Q beam component signals. The second stage serial-in/serial-out charged coupled devices essentially operate as analog delay lines which apply preselected delays to selected ones of the I and Q beam component signals in order to correct for the differential time it takes for the incident acoustic wave 12 to fill adjacent groups of S elements in accordance with equation (9).

The selectively delayed I and Q beam component signals are combined by the second stage summing delay modules 34 and form an I and a Q beam which are applied over lines 50 and 52 to an analog computer 54 for approximating the square root of the sum of the squares of the I and the Q beams. The computer 54, which may comprise a well known operational amplifier arrangement, produces its output as amplitude signals representing consecutive azimuth ordered output beam patterns.

A clock 56 provides a clocking signal, represented by CLK and CLK/2, which controls the signal processing of the novel beamformer 30 of the present invention. It is to be noted that since the array 12 is sampled in quadrature pairs, the clocking signal for controlling the multiplexers 36 is twice the clocking signal for controlling the modules 32 and 34. As above discussed, the beamformer 30 is focused by ramping the clock rate from about 95% $f_{c\infty}$ at minimum range to about 99.5% $f_{c\infty}$ at maximum range obeying the relationship of equation (10).

Since the array has circular symmetry, each beam is formed with exactly the same operation. Thus, as the oldest sample leaves each charged coupled device in the first stage modules 32 and the second stage modules 34, the next beam is formed. That is, one beam is formed for each quadrature sampled hydrophone. Every charged coupled device clock pulse thus provides the next beam output of the computer 54. The first stage samplers 36 retrace and again take the first sample required for the left end beam direction after scanning all the elements required in all of the beams used to display a preselected azimuth.

Synchronization of the concurrently run first stage modules is accomplished by offsets in the multiplexers of the first stage modules. Referring now to FIG. 4, generally designated at 60 is a diagram useful in explaining the offsets. Assume for the purpose of explanation that C corresponds to sixteen (16) first stage modules. The samples that form a given azimuthal center beam (K) have to correspond to the sixteen (16) sets of elements indicated. For the clockwise scanning direction 37, the first stage sampling positions are at the right edge of the set of samples (S) used in forming the beam. If we neglect the fill time, these positions would be as shown in FIG. 4A. However, if fill time is considered, the samplers must be offset in time to allow for the fill time delays. Let us assume that the samplers are scanning the array at the speed of sound. Then the sampler positions must be earlier in position by a distance corresponding to the fill time delay. This situation is shown in FIG. 4B. The end modules (1 and 16) are taken as reference and have no fill time delay. The delays required for the inner modules are indicated as D2 through D15. The sampler positions in FIG. 4B are offset from that in FIG. 4A by the corresponding delay to synchronize the concurrently run module processes for scanning the array at the speed of sound. This scanning speed was selected to make the timing problem easier to visualize. Now consider what a desirable scanning rate might be.

The minimum acceptable rate would be the formation of all beams required for the display once every resolution cell, r. Then, if B beams are used to display a preselected azimuth, they must be scanned in a time (Y) of 2r/c, where c is the nominal speed of sound in water. Thus, depending on the design parameters, the minimum acceptable scan rate would be B/Y. The offsets required by equation (8) may be implemented in this case by suitably scaling the relative positions of the sampler positions shown in FIG. 4B by a factor (f) that is given by the ratio between B/Y and scanning at the speed of sound.

In summary, there is provided a within-pulse scanning beamformer for beamforming a soundhead having a circular or cylindrical arc array of hydrophone elements. The beamformer uses quadrature sampled phase shift beamforming in a first stage and true delay beamforming in a second stage in order to correct for the array fill time. The beamformer focuses at all nearfield ranges of interest by ramping the clocking signal that controls the signal processing functions from a first preselected frequency to a second preselected frequency in a time interval that corresponds to the pulse period.

It is to be clearly understood that many modifications of the herein shown and described invention may be effected without departing from the scope of the appended claims.

What is claimed is:

1. In a sonar of the type comprising a soundhead having an arcuate array of hydrophone elements and wherein a plurality of azimuthally ordered beam patterns are sequentially formed from F adjacent hydrophone elements, and wherein due to the geometry of the soundhead, it takes an impinging spherical longitudinally propagating compressional wave a non-zero time to fill the F elements used to form said beam pattern in a particular azimuthal direction, which time limits the resolution of the sonar, a method for sequentially forming said beam pattern that accounts for the fill time and focuses at all nearfield ranges of interest, comprising the steps of:

sampling in quadrature pairs the F elements used to form said beam pattern concurrently in adjacent C groups of S elements each, where C multiplied by S equals F;

processing said C groups of S elements of said F quadrature sampled pairs concurrently to provide C Inphase and Quadrature phase beam component signals;

applying predetermined delays to preselected ones of said C Inphase and Quadrature phase beam component signals in a manner that depends upon the differential time it takes for said spherical longitudinally propagating compressional wave to fill adjacent groups of said S elements;

combining said selectively delayed Inphase and Quadrature phase beam component signals to provide an Inphase and a Quadrature phase beam; and computing the square root of the sum of the squares of the magnitude of said Inphase and Quadrature phase beams sequentially to scan said beam pattern through a preselected azimuth.

2. The method as recited in claim 1, further including the step of:

controlling said sampling, said processing and said delaying steps by a multirate clocking signal to focus said beam pattern at all nearfield ranges of interest.

3. The method as recited in claim 2, wherein said spherical longitudinally propagating compressional wave has a pulse period, and wherein said multirate clocking signal ramps from a first preselected frequency to a second preselected frequency within said pulse period.

4. A beamformer for beamforming a soundhead having an arcuate array of hydrophone elements that accounts for the time it takes for impinging acoustic energy to fill the soundhead and that focuses at all nearfield ranges of interest, comprising:

a clock for providing a clocking signal;

means responsive to said clocking signal for sampling F adjacent hydrophone elements in quadrature;

means connected to said clocking signal and to said sampling means for concurrently processing said F quadrature sampled elements in C groups having S quadrature samples for providing C Inphase (I) and C Quadrature phase (Q) beam component signals;

means connected to said clocking signal and to said processing means for applying predetermined delays to preselected ones of said I and Q beam component signals;

means connected to said clocking signal and to said delaying means for combining said selectively delayed I and Q beam component signals to form an I and a Q beam from said F elements; and means connected to said clocking signal and to said combining means for sequentially computing the square root of the sum of the squares of the magnitude of said I and said Q beams to provide a very high resolution azimuthally ordered beam pattern that scans a preselected azimuth.

5. A beamformer as recited in claim 4, wherein said clocking signal has a changing rate to focus said beam pattern at all nearfield ranges of interest.

6. The beamformer as recited in claim 4, wherein said delaying and combining means includes a charge coupled device.

7. A beamformer as recited in claim 6, wherein said charge coupled device has C parallel channels and is of the summing serial-in/serial-out type.

8. A beamformer as recited in claim 4, wherein said sampling means includes a plurality of analog multiplexers.

9. A beamformer as recited in claim 8, wherein said concurrent processing means includes a plurality of charge coupled devices operatively connected to said analog multiplexers.

10. A beamformer as recited in claim 9, wherein said charge coupled devices are of the summing parallel-in/serial-out type.

11. A beamformer as recited in claim 9, wherein said concurrent processing means further includes sine/cosine resistor dividers operatively connected to said analog multiplexers and to said charge coupled devices to accomplish phase shift steering.

12. A method for beamforming a circular array of hydrophones which output signals in response to incident acoustic energy to scan a beam pattern through a preselected azimuth during a pulse period comprising the steps of:
   selecting F hydrophone output signals to form said beam;
   processing the F hydrophone signals in C groups of S elements each to form C weighted and phase shift steered beam components from respective ones of said C groups of said S hydrophone output signals;
   selectively delaying in time preselected ones of said C weighted and phase shift steered beam components in a manner to compensate for the time it takes the incident acoustic energy to fill adjacent groups of the S elements;
   combining said selectively delayed, weighted and phase shifted beam components to form said beam pattern; and
   controllably varying the timing of the processing and delaying steps to focus the beam pattern at all nearfield ranges of interest.

13. In a method as recited in claim 12, wherein said weighted and phase shifted beam components are formed by charge coupled devices utilized at transversal filters.

14. In a method as recited in claim 13, wherein said weighted and phase shifted beam components are delayed by charge coupled devices utilized as analog delay lines.

15. In a method as recited in claim 14, wherein said timing of said charge coupled devices are controllably varied by clocking the charge coupled devices by a clocking signal that ramps from a first preselected frequency to a second preselected frequency within said pulse period to focus said beam pattern at all nearfield ranges of interest.

16. A very high resolution sonar beamformer for beamforming an arcuate array of hydrophones of the type that scans a beam pattern through a preselected azimuth, and wherein said beam pattern is sequentially formed from F hydrophone output signals, comprising:
   plural analog means for concurrently processing the F hydrophone elements used to form said beam patterns in C groups of S elements to form C weighted and phase shift steered Inphase (I) and Quadrature phase (Q) beam components from respective ones of said C groups of said S hydrophone output signals;
   plural analog means for selectively delaying in time preselected ones of said C weighted and phase shift steered I and Q beam components in a manner that compensates for the time it takes for said incident acoustic energy to fill adjacent groups of said S elements and for combining said delayed beam components to form an I and a Q beam; and
   means operatively connected to said plural analog processing means and said plural analog delaying means for focusing said I and said Q beam at all nearfield ranges of interest.

17. A beamformer as recited in claim 16, wherein said plural analog processing means includes a charge coupled device utilized as a transversal filter for phase shift steering.

18. A beamformer as recited in claim 17, wherein said plural analog delay means includes a charge coupled device operated as a summing analog delay line.

19. A beamformer as recited in claim 18, wherein said charge coupled devices are under control of a clocking signal that ramps from a first preselected frequency to a second preselected frequency to focus said array.

20. A very high resolution within-pulse quadrature sampled phase shift beamformer for beamforming a soundhead having an arcuate array of hydrophones in a manner that sequentially forms a beam from F adjacent hydrophone output signals the performance of which is not resolution limited either by a failure of the beamformer to focus at all nearfield ranges of interest or by a failure to account for the time it takes for incident acoustic energy to fill the F elements used to form the beam, comprising:
   a clock for providing a clocking signal;
   a plurality of first stage modules responsive to the clocking signal for concurrently sampling in quadrature C groups of S hydrophone elements, where $C \times S = F$, and for concurrently processing each of the C sampled groups to form C first stage I and Q beam component signals;
   second stage means responsive to the clocking signal and to the I and Q first stage beam component signals for applying predetermined time delays to preselected ones of the I and the Q beam component signals in order to correct for the fill time; and
   means responsive to the selectively delayed I and Q beam component signals and to the clocking signal for combining the selectively delayed I and Q beam component signals to form an I and a Q beam for a particular azimuthal direction.

21. A beamformer as recited in claim 20, wherein said first stage modules include C first stage samplers that scan said soundhead, and wherein synchronization of the concurrently run first stage module processing is accomplished through the use of preselected offsets of the first stage samplers relative to each other as they scan the soundhead.

22. A beamformer as recited in claim 21, wherein said offsets are selected such that for a given scan rate each of the C samplers samples the S elements used in the formation of the first stage beam component signal at a time that corresponds to the fill time for a particular group of S elements.

* * * * *